C. E. WARD.
SHIFTING MECHANISM FOR DISK HARROWS.
APPLICATION FILED SEPT. 10, 1919.
1,421,047.
Patented June 27, 1922.
2 SHEETS—SHEET 2.
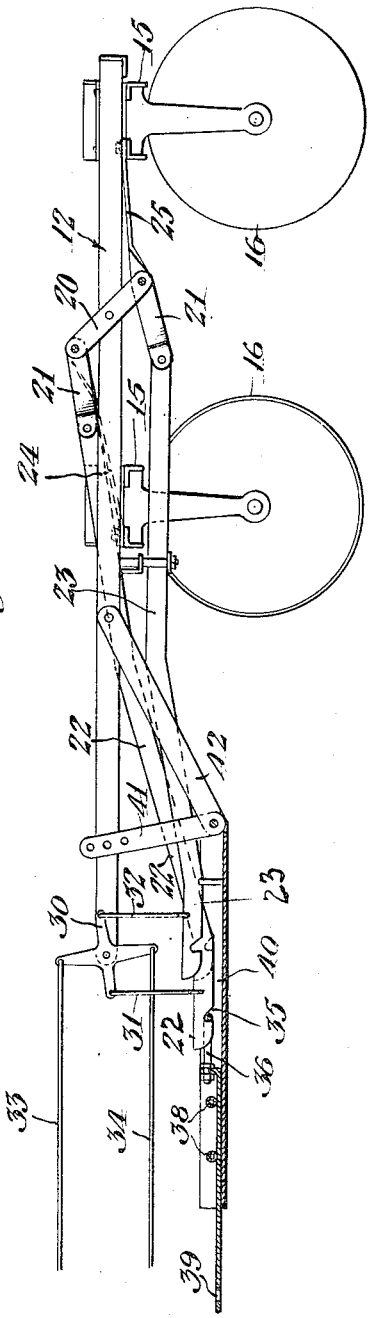
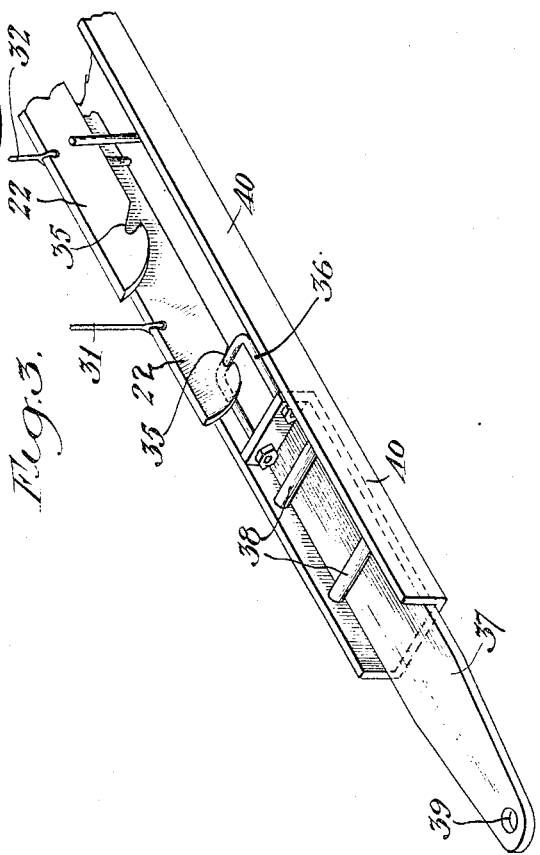
Inventor
Claton E. Ward
by Graham Harris
Attorney

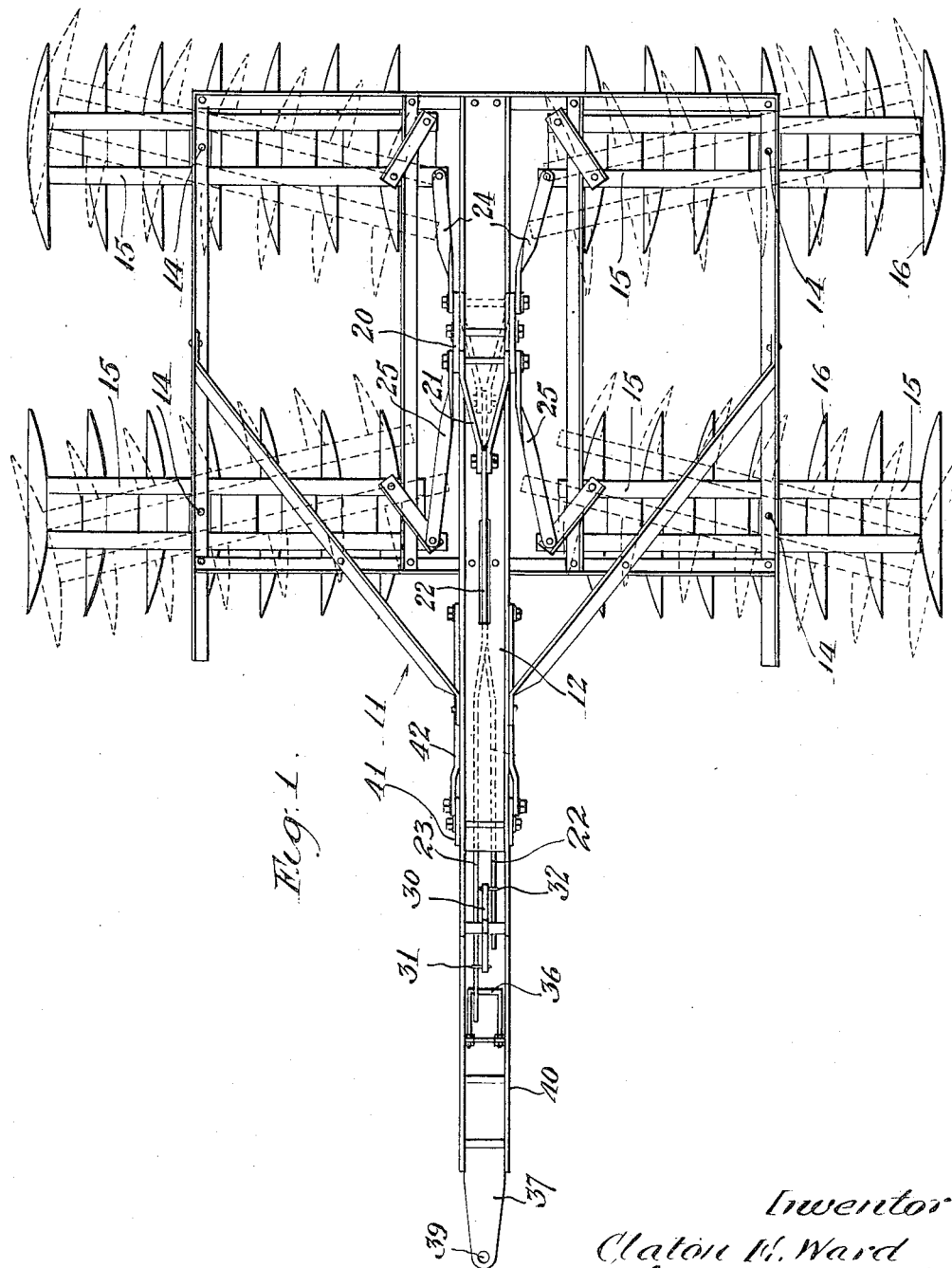

UNITED STATES PATENT OFFICE.

CLATON E. WARD, OF OXNARD, CALIFORNIA, ASSIGNOR TO BRENNEIS MANUFACTURING COMPANY, A CORPORATION OF CALIFORNIA.

SHIFTING MECHANISM FOR DISK HARROWS.

1,421,047.  Specification of Letters Patent. Patented June 27, 1922.

Application filed September 10, 1919. Serial No. 322,995.

*To all whom it may concern:*

Be it known that I, CLATON E. WARD, a citizen of the United States, residing in Oxnard, county of Ventura, State of California, have invented a new and useful Improvement comprising the Shifting Mechanism for Disk Harrows, of which the following is a specification.

My invention relates to disk harrows and an object of the invention is to provide a harrow in which the disks can either be run parallel to the line of motion for the purpose of transporting the harrow, this position being hereinafter called the in-operative position, or in which the disk can be easily inclined to the line of motion for the purpose of putting them into operation, this position being hereinafter called the operative position.

A further object of the invention is to provide means by which such harrows can be readily turned from the operative to the in-operative position by the driver of the harrow without the necessity for any considerable muscular exertion on the part of the driver. And still a further object of the invention is to provide means by which the change can be accomplished wholly by the draw-bar pull of the tractor or team which draws the harrow.

A still further object of the invention is to provide means by which the driver can make the change at any time without leaving his seat.

In the embodiment of my invention shown in the drawings, Fig. 1 is a plan view of a harrow equipped with my invention.

Fig. 2 is a side elevation partly in section illustrating the shifting mechanism.

Fig. 3 is a perspective view further illustrating it.

In the form of harrow shown in these drawings, 11 is a main frame which includes a channel 12 extending centrally therethrough. Pivoted on bolts 14 on each of the four corners of the frame is a gang frame 15 on which is pivoted a plurality of disks 16. These gang frames may either assume the position shown in full lines, this being the in-operative or rolling position, or they may be pulled around into the position shown in dotted lines, this being the disking or operative position.

To accomplish this change in position, I provide a rocking lever 20 pivoted to the channel 12 as shown in Fig. 2 this lever being connected through pairs of short links 21 with hook-bars 22 and 23. The ends of the link 20 are also connected through links 24 and 25 with the ends of the frames 15. The hook bars 22 and 23 are connected to a lifting lever 30 by means of rods 31 and 32, this lever being rocked by means of lines 33 and 34. The ends of the levers 22 and 23 are each provided with a slot 35 which is of proper size to engage a U-bolt 36 secured in a tongue 37 sliding in a channel 40 the tongue being restrained therein by means of cross bars 38. The tractor or team used to pull the harrow is attached to the draw-bar 37 which is provided with a hole 39 for that purpose. The channel 40 is secured to the channel 12 through links 41 and 42.

The method of operation of the invention is as follows:

The parts being in the position shown in full lines in Fig. 1, that is to say in the in-operative position the harrow can be readily transported the disks acting as wheels upon which the harrow rolls. If it is desired to pull the disks into the operating position, that is into the position shown in dotted lines in Fig. 1, the driver simply backs up the tractor thus causing the draw-bar 37 to slide backward in the I-beam 40 the U-bolt tongue pushing out of the slot 35 in the hook-bar 23 and into a position below and somewhat behind the slot 35 in the hook-bar 22. The lines 33 and 34 lead to the tractor and the operator by pulling on these lines can actuate the lifting lever 30 in such a manner as to drop the end of the hook-bar 22 and raise the end of the member 23.

With the member 22 in its lower position it readily engages in the U-bolt 36 when the tractor is started, the member 23 being raised in such a position that it passes over the U-bolt without catching therein. As the tractor is started forward, the pull on the member 22 rocks the lever 20 in a clockwise direction, as seen in Fig. 2 pushing on the members 25 and pulling on the members 24 in such a manner as to throw the frames 15 from the position shown in full lines in Fig. 1 into the operative position shown in dotted lines in that figure at the same time pulling the hook-bar 22 forward and the hook-bar 23 backward.

It will be noted that the pull of the tractor is utilized to throw the disks around so that it requires no effort on the part of the driver other than to manipulate the lines 33 and 34 to throw either the hook-bar 22 or the hook-bar 23 into operative relationship with the U-bolt 36. If it is desired to throw the disks back into the in-operative position the driver simply backs up dropping the lever 23 which is in the rearward position into engagement with the U-bolt 36 and pulling it forward into the position shown in Fig. 3 this pulling the disks into their in-operative position.

I claim as my invention:—

1. In a harrow; a main frame; a plurality of gang frames each carrying a plurality of disks and each pivoted to said main frame; a rocking lever pivoted to said main frame; means by which said rocking lever can throw said gang frames into either operative or in-operative positions; two hook bars each secured to one end of said rocking lever; a draw-bar to which the traction means is attached; and means by which the driver of the harrow can attach said draw-bar to either of said hook bars at will.

2. In a harrow; a main frame; a plurality of gang frames each carrying a plurality of disks and each pivoted to said main frame; a rocking lever pivoted to said main frame; means by which said rocking lever can throw said gang frames into either operative or in-operative positions; two hook bars each secured to one end of said rocking lever; a draw-bar to which the traction means is attached; the ends of said hook bars having open slots formed therein; a U-bolt carried on said draw-bar in such a position as to be engaged by said open slots in said hook bars; and means by which the driver of the harrow can cause either of said open slots to engage said U-bolt.

3. In a harrow; a main frame; a plurality of gang frames each carrying a plurality of disks and each pivoted to said main frame; a rocking lever pivoted to said main frame; means by which said rocking lever can throw said gang frames into either operative or in-operative positions; two hook bars each secured to one end of said rocking lever; a draw-bar free to slide with relation to said main frame to which the traction means is attached; and means by which the driver of the harrow can attach said drawbar to either of said hook bars at will.

4. In a harrow; a main frame; a plurality of gang frames each carrying a plurality of disks and each pivoted to said main frame; a rocking lever pivoted to said main frame; means by which said rocking lever can throw said gang frames into either operative or in-operative positions; two hook bars each secured to one end of said rocking lever; a drawbar free to slide with relation to said main frame to which the traction means is attached; the ends of said hook bars having open slots formed therein; a U-bolt carried on said draw-bar in such a position as to be engaged by said open slots in said hook-bars; and means by which the driver of the harrow can cause either of said open slots to engage said U-bolt.

5. In a vehicle; a draft means by which said vehicle may be propelled; mechanism carried on said vehicle and so mounted that it may assume either of two positions; two hook bars; direct means by which a forward pull on one of said hook bars moves said mechanism in one direction; reverse means by which a forward pull on the other hook bar pulls said mechanism in the opposite direction; and means for attaching either hook bar to said draft means.

In testimony whereof, I have hereunto set my hand at Oxnard, California, this 2nd day of September, 1919.

CLATON E. WARD.